US010107183B2

(12) United States Patent
Sherrill et al.

(10) Patent No.: US 10,107,183 B2
(45) Date of Patent: Oct. 23, 2018

(54) ECCENTRIC PLANETARY TRACTION DRIVE SUPER-TURBOCHARGER

(71) Applicant: VANDYNE SUPERTURBO, INC., Loveland, CO (US)

(72) Inventors: Ryan Sherrill, Loveland, CO (US); Jared William Brown, Loveland, CO (US)

(73) Assignee: SuperTurbo Technologies, Inc., Loveland, CO (US)

( * ) Notice: Subject to any disclaimer, the term of this patent is extended or adjusted under 35 U.S.C. 154(b) by 416 days.

(21) Appl. No.: 14/935,541

(22) Filed: Nov. 9, 2015

(65) Prior Publication Data

US 2016/0146096 A1 May 26, 2016

Related U.S. Application Data

(60) Provisional application No. 62/082,508, filed on Nov. 20, 2014.

(51) Int. Cl.
| F02B 37/10 | (2006.01) |
| F02B 39/04 | (2006.01) |
| F16H 13/06 | (2006.01) |

(52) U.S. Cl.
CPC .......... *F02B 37/105* (2013.01); *F02B 39/04* (2013.01); *F16H 13/06* (2013.01); *Y02T 10/144* (2013.01)

(58) Field of Classification Search
None
See application file for complete search history.

(56) References Cited

U.S. PATENT DOCUMENTS

| 236,150 A | 1/1881 | Fitch |
| 282,699 A | 8/1883 | Brock |
| 1,526,493 A | 2/1925 | Dolton |
| 1,550,796 A | 8/1925 | Gammons |
| 1,686,446 A | 10/1928 | Gilman |
| 1,691,625 A | 11/1928 | Chilton |
| 1,718,846 A | 6/1929 | Arter |
| 1,979,170 A | 10/1934 | Nardone |
| 2,076,057 A | 4/1937 | Almen |
| 2,173,595 A | 9/1939 | Schutte |

(Continued)

FOREIGN PATENT DOCUMENTS

| EP | 0517675 | 8/1995 |
| EP | 1400667 | 3/2004 |

(Continued)

OTHER PUBLICATIONS

U.S. Appl. No. 12/536,421, filed Aug. 5, 2009.

(Continued)

*Primary Examiner* — Jacob S. Scott
*Assistant Examiner* — Timothy Hannon
(74) *Attorney, Agent, or Firm* — William W. Cochran; Cochran Freund & Young LLC (57) ABSTRACT

Disclosed are embodiments of eccentric planetary traction drives for use in a driven turbocharger. The eccentric planetary provides torque-based loading of the traction interfaces in the traction drive. A loading planet has a larger outer diameter and has translative movement when torque is applied to the traction drive so that it is forced into a wedge gap between the turbo shaft and outer ring of the planetary drive. The torque capacity of the traction drive increases with an increase of torque demand.

17 Claims, 8 Drawing Sheets

(56) References Cited

U.S. PATENT DOCUMENTS

| | | |
|---|---|---|
| 2,216,494 A | 10/1940 | Kurtz et al. |
| 2,278,181 A | 3/1942 | Lieberherr |
| 2,397,941 A | 4/1946 | Birkigt |
| 2,412,351 A | 12/1946 | Mount |
| 2,542,539 A | 2/1951 | Kuhrt et al. |
| 2,573,258 A | 10/1951 | Gerritsen |
| 2,585,698 A | 2/1952 | Schneider |
| 2,585,968 A | 2/1952 | Schneider |
| 2,585,986 A | 2/1952 | Andreasson |
| 2,586,725 A | 2/1952 | Schottler |
| 2,590,800 A | 3/1952 | Stephenson |
| 2,620,621 A | 12/1952 | Nettel |
| 2,652,006 A | 9/1953 | Simonson |
| 2,696,888 A | 12/1954 | Chillson et al. |
| 2,701,970 A | 2/1955 | Kraus |
| 2,803,507 A | 8/1957 | Mempel et al. |
| 2,874,592 A | 2/1959 | Oehrli |
| 2,878,692 A | 3/1959 | Wolf |
| 2,901,924 A | 9/1959 | Banker |
| 2,905,026 A | 9/1959 | Oehrli |
| 2,913,932 A | 11/1959 | Oehrli |
| 2,941,422 A | 6/1960 | Barish |
| 2,973,671 A | 3/1961 | Elkins |
| 3,035,460 A | 5/1962 | Guichard |
| 3,044,683 A | 7/1962 | Woollenweber |
| 3,163,984 A | 1/1965 | Dumont |
| 3,203,278 A | 8/1965 | General |
| 3,237,468 A | 3/1966 | Schottler |
| 3,246,531 A | 4/1966 | Kashihara |
| 3,248,960 A | 5/1966 | Schottler |
| 3,293,945 A | 12/1966 | Stockton |
| 3,420,122 A | 1/1969 | Okabe |
| 3,423,927 A | 1/1969 | Scherenberg |
| 3,494,224 A | 2/1970 | Fellows et al. |
| 3,504,574 A | 4/1970 | Okabe |
| 3,673,797 A | 7/1972 | Wilkinson |
| 3,676,999 A | 7/1972 | Oldfield |
| 3,707,888 A | 1/1973 | Schottler |
| 3,745,844 A | 7/1973 | Schottler |
| 3,793,907 A | 2/1974 | Nakamura et al. |
| 3,988,894 A | 11/1976 | Melchior |
| 4,052,915 A | 10/1977 | Kraus |
| 4,089,569 A | 5/1978 | Rempel |
| 4,215,549 A | 8/1980 | Daeschner |
| 4,270,400 A | 6/1981 | Fodor |
| 4,287,791 A | 9/1981 | Numazawa et al. |
| 4,312,183 A | 1/1982 | Regar |
| 4,314,485 A | 2/1982 | Adams |
| 4,345,486 A | 8/1982 | Olesen |
| 4,378,677 A | 4/1983 | Zumstein |
| 4,398,436 A | 8/1983 | Fisher |
| 4,424,726 A | 1/1984 | Gailbraith |
| 4,449,370 A | 5/1984 | Ream |
| 4,489,992 A | 12/1984 | Brandenstein et al. |
| 4,541,305 A | 9/1985 | Hamabe |
| 4,570,501 A | 2/1986 | de Bris Perry |
| 4,592,247 A | 6/1986 | Mutschler |
| 4,593,574 A | 6/1986 | Sinn et al. |
| 4,616,481 A | 10/1986 | Melchior et al. |
| 4,667,525 A | 5/1987 | Schottler |
| 4,693,134 A | 9/1987 | Kraus |
| 4,700,542 A | 10/1987 | Wang |
| 4,718,781 A | 1/1988 | Gerard |
| 4,729,225 A | 3/1988 | Bucher |
| 4,856,374 A | 8/1989 | Kreuzer |
| 5,025,671 A | 6/1991 | Kraus |
| 5,033,269 A | 7/1991 | Smith |
| 5,037,361 A | 8/1991 | Takahashi |
| 5,385,514 A | 1/1995 | Dawe |
| 5,397,279 A | 3/1995 | McCotter, Jr. |
| 5,458,855 A | 10/1995 | Gillbrand |
| 5,551,929 A | 9/1996 | Fritsch |
| 5,560,207 A | 10/1996 | Ramsden et al. |
| 5,586,540 A | 12/1996 | Marzec et al. |
| 5,713,204 A | 2/1998 | Kadlicko |
| 5,724,813 A | 3/1998 | Fenelon et al. |
| 5,729,978 A | 3/1998 | Hiereth et al. |
| 5,775,417 A | 7/1998 | Council |
| 5,887,434 A | 3/1999 | Arnell et al. |
| 5,974,792 A | 11/1999 | Isobe |
| 6,041,602 A | 3/2000 | Dickey |
| 6,050,094 A | 4/2000 | Udd et al. |
| 6,050,095 A | 4/2000 | Blake |
| 6,095,940 A | 8/2000 | Ai et al. |
| 6,145,313 A | 11/2000 | Arnold |
| 6,227,180 B1 | 5/2001 | Hoffmann et al. |
| 6,343,473 B1 | 2/2002 | Kanesaka |
| 6,406,399 B1 | 6/2002 | Ai |
| 6,408,626 B1 | 6/2002 | Arnell |
| 6,470,864 B2 | 10/2002 | Kim et al. |
| 6,601,388 B1 | 8/2003 | Gladden |
| 6,651,432 B1 | 11/2003 | Gray, Jr. |
| 6,681,574 B2 | 1/2004 | Berglund et al. |
| 6,725,653 B2 | 4/2004 | Brown et al. |
| 6,729,315 B2 | 5/2004 | Onodera et al. |
| 6,857,263 B2 | 2/2005 | Gray, Jr. et al. |
| 6,871,498 B1 | 3/2005 | Allen et al. |
| 6,912,852 B2 | 7/2005 | Gottemoller et al. |
| 6,960,147 B2 | 11/2005 | Kolstrup |
| 6,994,531 B2 | 2/2006 | Dairokuno et al. |
| 7,025,042 B2 | 4/2006 | Gray, Jr. |
| 7,032,382 B2 | 4/2006 | Onodera et al. |
| 7,055,507 B2 | 6/2006 | Kelley, Jr. |
| D130,946 S | 6/2007 | Winsor et al. |
| 7,237,532 B2 | 7/2007 | Gray, Jr. |
| 7,455,617 B2 | 11/2008 | Miller et al. |
| 7,490,594 B2 | 2/2009 | VanDyne et al. |
| 7,491,149 B2 | 2/2009 | Greenwood et al. |
| 7,492,594 B2 | 2/2009 | Pal |
| 7,540,818 B2 | 6/2009 | Miller et al. |
| 8,062,161 B2 | 11/2011 | Marumoto |
| 8,152,677 B2 | 4/2012 | Knepper et al. |
| 8,561,403 B2 | 10/2013 | VanDyne et al. |
| 8,608,609 B2 | 12/2013 | Sherrill et al. |
| 8,668,614 B2 | 3/2014 | Sherrill et al. |
| 8,677,751 B2 | 3/2014 | VanDyne et al. |
| 8,769,949 B2 | 3/2014 | VanDyne et al. |
| 8,820,056 B2 | 9/2014 | VanDyne et al. |
| 9,217,363 B2 | 12/2015 | Riley et al. |
| 2003/0196436 A1 | 10/2003 | Hoecker et al. |
| 2005/0277514 A1 | 12/2005 | Hiroyuki et al. |
| 2006/0032225 A1 | 2/2006 | VanDyne |
| 2006/0070382 A1 | 4/2006 | Karlsson |
| 2006/0157291 A1 | 7/2006 | Puiu et al. |
| 2007/0062189 A1 | 3/2007 | Keppeler et al. |
| 2007/0130094 A1 | 6/2007 | Lien et al. |
| 2007/0130946 A1 | 6/2007 | Winsor et al. |
| 2007/0130948 A1 | 6/2007 | Boehm et al. |
| 2007/0197337 A1 | 8/2007 | Miller et al. |
| 2007/0275809 A1 | 11/2007 | Miller et al. |
| 2008/0141810 A1 | 6/2008 | Miller et al. |
| 2008/0236150 A1 | 10/2008 | Jarvi |
| 2008/0276756 A1 | 11/2008 | Marumoto |
| 2008/0282699 A1 | 11/2008 | Barthelet et al. |
| 2009/0277431 A1 | 11/2009 | Nitzke et al. |
| 2010/0031935 A1 | 2/2010 | VanDyne et al. |
| 2010/0174456 A1 | 7/2010 | Beaudoin et al. |
| 2010/0236503 A1 | 9/2010 | Bernt et al. |
| 2012/0165151 A1 | 6/2012 | Sherrill |
| 2015/0141188 A1 | 5/2015 | Sherrill |
| 2016/0146096 A1 | 5/2016 | Sherrill et al. |

FOREIGN PATENT DOCUMENTS

| | | |
|---|---|---|
| EP | 01300946 | 12/2004 |
| EP | 0994245 | 6/2005 |
| EP | 1550796 | 7/2005 |
| EP | 1711699 | 3/2007 |
| GB | 0206845 | 2/1924 |
| GB | 557970 | 12/1943 |
| JP | 61164039 | 7/1986 |
| JP | 3153947 | 7/1991 |
| WO | 2006022635 | 3/2006 |

(56) References Cited

FOREIGN PATENT DOCUMENTS

| WO | 2008008379 | 1/2008 |
|---|---|---|
| WO | 2011011019 | 1/2011 |
| WO | 2012170001 | 12/2012 |

OTHER PUBLICATIONS

U.S. Appl. No. 61/086,401, filed Aug. 5, 2008.
U.S. Appl. No. 61/231,628, filed Aug. 5, 2009.
International Search Report, dated May 4, 2012, in PCT Application Serial No. PCT/US2012/021932.
International Search Report, dated May 4, 2012, in PCT Application Serial No. PCT/US11/67151.
International Search Report, dated May 4, 2012, in PCT Application Serial No. PCT/US10/23398.
International Search Report, dated May 4, 2012, in PCT Application Serial No. PCT/US09/51742.
International Search Report, dated May 4, 2012, in PCT Application Serial No. PCT/US11/22298.

ECCENTRIC PLANETARY TRACTION DRIVE SUPER-TURBOCHARGER

BACKGROUND

Both turbochargers and superchargers are capable of enhancing the performance of an engine. Super-turbochargers are effective at enhancing the performance of engines. Super-turbochargers utilize turbo compounding and eliminate turbo lag and have the advantages of both turbochargers and superchargers.

SUMMARY

An embodiment of the invention may therefore comprise an eccentric planetary traction drive super-turbocharger that is driven by an engine system and driven by exhaust gases from the engine system comprising a turbo shaft, a turbine connected to one end of the turbo shaft, a compressor connected to an opposite end of the turbo shaft from the turbine, a first support planet held in a planet carrier, the first support planet having a first support planet outer traction surface that mates with the turbo shaft to form a first shaft-support planet traction interface that transfers torque between the turbo shaft and the first support planet, a second support planet held in the planet carrier, the second support planet having a second support planet outer traction surface that mates with the turbo shaft to form a second shaft-support planet traction interface that transfers torque between the turbo shaft and the second support planet, a loading planet located substantially opposite the support planets with respect to the turbo shaft and having a loading planet outer traction surface that mates with the turbo shaft to form a shaft-loading planet traction interface, the shaft-loading planet traction interface transferring torque between the turbo shaft and the loading planet, wherein the loading planet outer traction surface of the loading planet is of a larger diameter than the first support planet outer traction surface and the second support planet outer traction surface, an outer ring that mates with the first support planet, the second support planet and the loading planet and that is offset from the turbo shaft such that a wedge gap exists where the loading planet is located so that translative movement of the loading planet will force the loading planet into a smaller space between the outer ring and the turbo shaft and increase normal forces through the shaft-loading planet traction interface and the first and second shaft-support planet traction interfaces, and a transfer gear coupled to the outer ring that couples the eccentric planetary traction drive super-turbocharger to the engine system.

An embodiment of the invention may further comprise a method of transferring rotational mechanical energy in a super-turbocharger having an eccentric planetary traction drive comprising providing a turbo shaft that is connected to a turbine and a compressor, driving the super-turbocharger mechanically with an engine system and with exhaust gases from the engine system, providing a first support planet and a second support planet wherein each of the first support planet and the second support planet is held in a planet carrier and have support planet outer traction surfaces that mate with the turbo shaft to form shaft-support planet traction interfaces that transfer torque between the turbo shaft and the support planets, locating a loading planet substantially opposite the first support planet and the second support planet, the loading planet comprising a loading planet outer traction surface that mates with the turbo shaft to form a shaft-loading planet traction interface that transfers torque between the turbo shaft and the loading planet, wherein the loading planet outer traction surface of the loading planet is of a larger diameter than the support planet outer traction surfaces of the first support planet and the second support planet, providing an outer ring that mates with the first support planet, the second support planet and the loading planet and is offset from the turbo shaft such that a wedge gap exists where the loading planet is located so that translative movement of the loading planet will force the loading planet into a smaller space between the outer ring and the turbo shaft, and coupling a transfer gear to the outer ring that couples the super-turbocharger to the engine system.

An embodiment of the invention may further comprise an eccentric planetary traction drive super-turbocharger that is both driven mechanically by an engine system and driven by exhaust gases from the engine system comprising a turbo shaft with two equal but opposite slanted shaft traction surfaces that slope outwardly on the turbo shaft, a turbine connected to one end of the turbo shaft, a compressor connected to an opposite end of the turbo shaft from the turbine, two support planets of a first diameter having equal but opposite slanted outer traction surfaces that slope inwardly on the two support planets, where an outer portion of each slanted outer traction surface mates with the slanted shaft traction surfaces to form two support planet-shaft traction interfaces that transmit torque between the turbo shaft and the two support planets as well as locate the turbo shaft axially and absorb thrust forces from the turbine and the compressor, a loading planet of a second diameter with equal but opposite slanted outer traction surfaces that slope inwardly on the loading planet, wherein an outer portion of each slanted outer traction surface mates with the slanted shaft traction surfaces to form loading planet-shaft traction interfaces that transmit torque between the turbo shaft and the planets as well as locate the turbo shaft axially and absorb thrust forces from the turbine and the compressor, an outer ring with slanted ring traction surfaces that mate with inner portions of each of the two support planet outer traction surfaces and the loading planet outer traction surface to form a plurality of planet-ring traction interfaces that transmit torque between the two support planets, the loading planet and the outer ring, wherein the plurality of planet-ring traction interfaces are of a smaller diameter than the planet-shaft traction interfaces to increase the rotational speed reduction ratio between the turbo shaft and the outer ring, and a transfer gear coupled to the outer ring that couples the eccentric planetary traction drive super-turbocharger to the engine system, wherein the outer ring is located eccentrically to the turbo shaft to form a wedge gap, the loading planet being located so that when torque is applied to the eccentric planetary traction drive, the loading planet translatively moves into a smaller area between the turbo shaft and the outer ring, increasing normal forces on the two support planet-shaft traction interfaces and the loading planet-shaft traction interface.

An embodiment of the invention may further comprise a method of transferring rotational mechanical energy in a driven turbocharger for an engine system comprising forming a traction surface on a turbo shaft of the driven turbocharger, mating a traction surface of at least one roller with the turbo shaft to form a traction interface with a rotational speed reduction from the turbo shaft to the roller, coupling the roller to a transfer gear that connects to the engine system, providing a torque-based loading mechanism that forces the roller toward the turbo shaft and increases a normal force on the traction interface when torque is applied to the transfer gear or the turbo shaft, so that torque capacity of the traction interface increases with an increase of torque demand through the traction interface.

DETAILED DESCRIPTION OF THE EMBODIMENTS

Figure 1A:
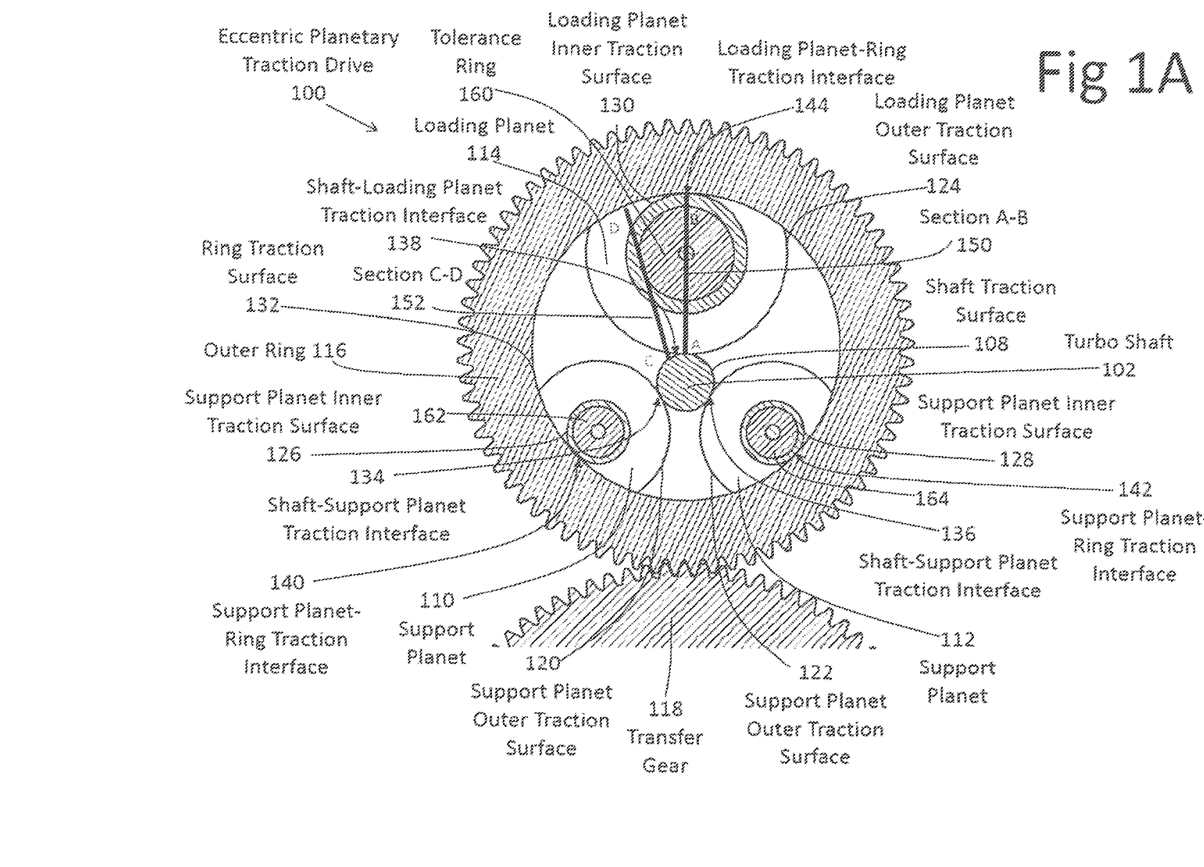
FIG. 1A is a schematic side view of an eccentric traction drive for use in a super-turbocharger.

FIG. 1A is a schematic side view of an eccentric traction drive 100 for use in a super-turbocharger. The eccentric traction drive 100 comprises one or more support planets 110, 112, a turbo shaft 102, a loading planet 114, an outer ring 116 and a transfer gear 118.

Turbo shaft 102 is located eccentrically in the traction drive 100. Turbo shaft 102 has one or more shaft traction surfaces 108. Support planets 110, 112 are held in place by a planet carrier (not shown in FIG. 1) and have support planet outer traction surfaces 120, 122 that mate with shaft traction surface 108 of turbo shaft 102. The mating of support planet outer traction surfaces 120, 122 with shaft traction surface 108 forms shaft-support planet traction interfaces 134, 136 that transmit torque between turbo shaft 102 and support planets 110, 112. Loading planet 114 is located on a side of turbo shaft 102 substantially opposite from support planets 110, 112. Loading planet 114 has loading planet outer traction surface 124. Loading planet outer traction surface 124 mates with shaft traction surface 108 to form shaft-loading planet traction interface 138. Shaft-loading planet traction interface 138 transmits torque between turbo shaft 102 and loading planet 114. Loading planet 114 is mounted in a planet carrier (not shown in FIG. 1) in a manner which allows translative directional movement, normal to the axis of rotation of the loading planet 114. This translative movement of loading planet 114 may be enabled by using a flexible mounting mechanism, such as a loading planet tolerance ring 160. Support planet tolerance rings 162, 164 can also be used to mount support planets 110, 112 to provide damping of the turbo shaft 102. Tolerance rings may be used inside a bore for bearing mounts. Tolerance rings are generally self-retaining, and may be designed to fit inside a nominal circumference. Tolerance rings 160 provide flexible mounting of the support planets 110, 112 as taught in U.S. Pat. No. 8,668,614, issued Mar. 11, 2014, entitled "HIGH TORQUE TRACTION DRIVE," which has been specifically incorporated herein by reference for all that it discloses and teaches. Tolerance rings 160 may be mounted on the recessed portions of bearing (See FIG. 3 where the bearings are referenced as 350, 352). Tolerance rings are more fully discussed in relation to embodiments of the invention in regard to FIG. 3.

In an embodiment of the invention shown in FIG. 1A, the support planets 110, 112 have support planet inner traction surfaces 126, 128 that have a diameter that is less than the support planet outer traction surfaces 120, 122. Similarly, loading planet 114 has a loading planet inner traction surface 130 that has a diameter less than loading planet outer traction surface 124. Support planet inner traction surfaces 126, 128 and loading planet inner traction surface 130 mate with ring traction surface 132 of outer ring 116. The mating of planet inner traction surfaces 126, 128 and loading planet inner traction surface 130 with ring traction surface 132 of outer ring 116 form support planet-ring traction interfaces 140, 142 and loading planet-ring traction interface 144 that transmit torque between support planets 110, 112, loading planet 114, and outer ring 116.

In an embodiment of the invention, support planet outer traction surfaces 120, 122 and loading planet outer traction surface 124 may mate with ring traction surface 132 to form support planet-ring traction interfaces 140, 142 and loading planet-ring traction interface 144. Separate planet inner traction surfaces 126, 128, 130 allow for a larger reduction ratio from turbo shaft 102 to outer ring 116 in a more compact package. The diameters of the planet inner traction surfaces 126, 128, 130 are sized so that the reduction ratio from turbo shaft 102 to outer ring 116 through support planets 110, 112 is the same as the reduction ratio from turbo shaft 102 to outer ring 116 through loading planet 114.

Outer ring 116 is located eccentrically with respect to turbo shaft 102, such that a wedge gap exists where loading planet 114 is located. The distance of section A-B 150 (as shown in FIG. 1) between the turbo shaft 102 and the outer ring 116 is greater than the distance of section C-D 152 (as shown in FIG. 1) between the turbo shaft 102 and the outer ring 116. When torque is applied in either direction through eccentric planetary traction drive 100, loading planet 114 has a translative movement from its nominal location, represented by section A-B, and it moves into a tighter space between turbo shaft 102 and outer ring 116, represented by section C-D, so that the normal force through all of the traction interfaces 134, 136, 138, 140, 142, 144 increases. The direction of the torque applied will affect the direction the loading planet 114 moves. The torque capacity of traction interfaces 134, 136, 138, 140, 142, 144 is proportional to the normal force on those interfaces and this provides a manner for increasing the torque capacity of traction interfaces 134, 136, 138, 140, 142, 144 as the torque requirement increases. Outer ring 116 is connected to a transfer gear 118 that connects eccentric planetary traction drive 100 to an engine system (not shown).

Figure 1B:
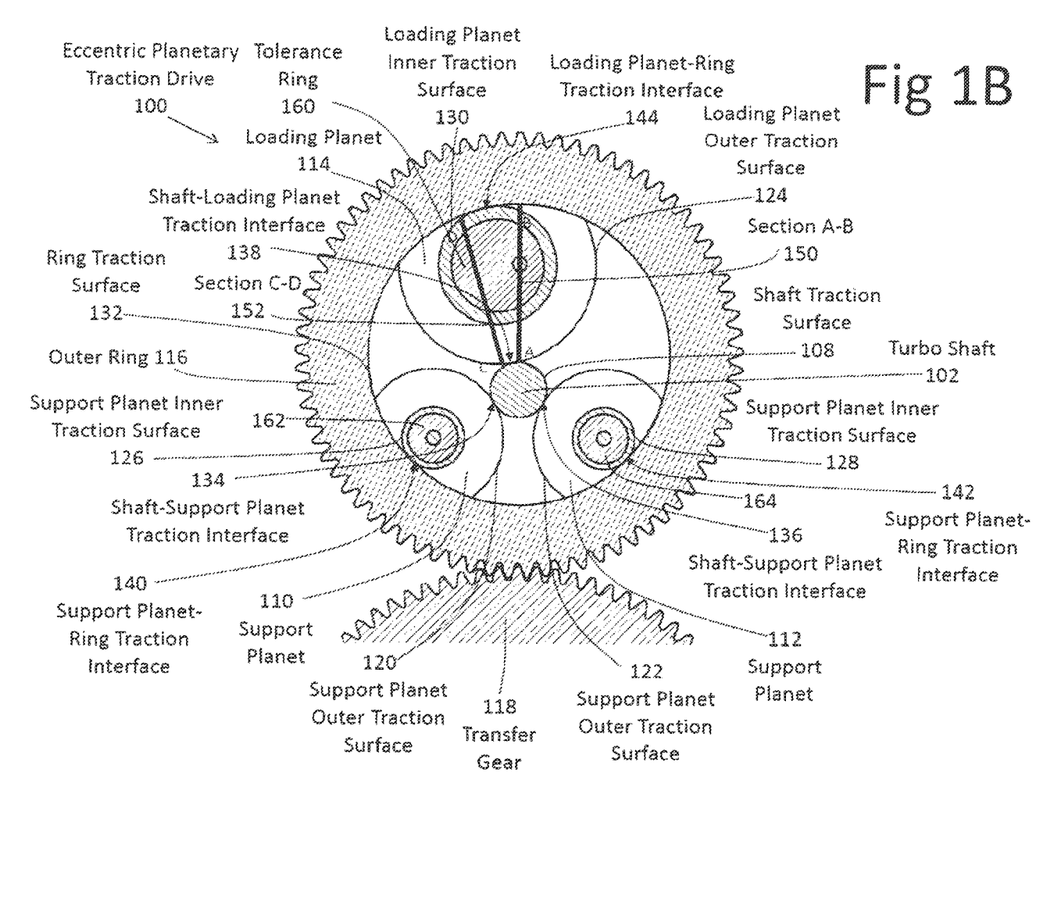
FIG. 1B is a variation of FIG. 1A with the loading planet moved into the wedge gap.

FIG. 1B is a schematic side view of an eccentric traction drive 100 for use in a super-turbocharger showing translative movement of the loading planet 114. As shown in FIG. 1B, the loading planet 114 is forced into the wedge gap between turbo shaft 102 and outer ring 116 when torque is transmitted through eccentric planetary traction drive 100. The movement is exaggerated to be more clearly shown. Accordingly, it is understood that the translative movement of the loading planet 114 may be less than that shown in FIG. 1B. As discussed above, section C-D 152 (with regard to FIG. 1A) between turbo shaft 102 and outer ring 116 is shorter than section A-B 150, so that loading planet 114 is effectively squeezed between turbo shaft 102 and outer ring 116, which increases normal forces through all of the traction interfaces 134, 136, 138, 140, 142, 144. This increase in normal forces increases the torque capacity of all of the traction interfaces 134, 136, 138, 140, 142, 144, so that the torque carrying capacity of eccentric planetary traction drive 100 increases with an increase in torque demand. Tolerance ring 160 can be used to provide flexible mounting of the loading planet 114.

Figure 2:
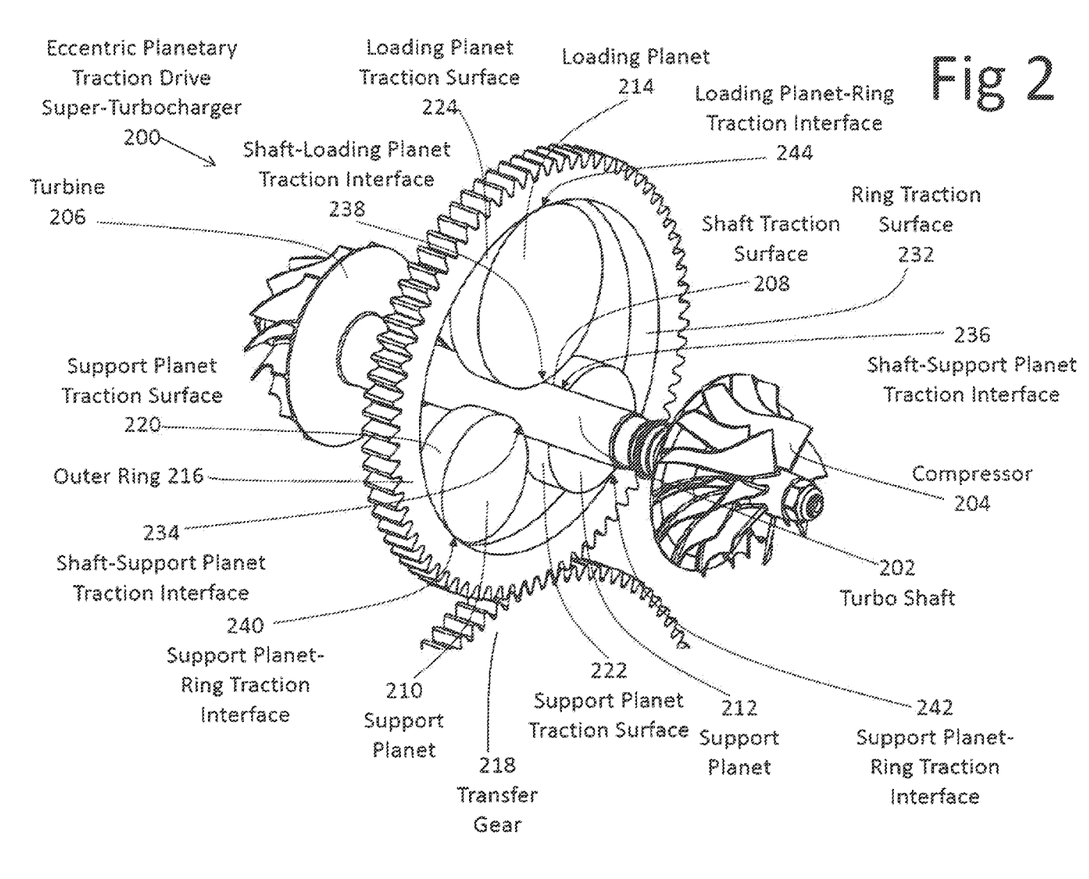
FIG. 2 is a schematic isometric view of a single diameter eccentric planetary traction drive super-turbocharger.

FIG. 2 is a schematic isometric view of a single diameter-planet eccentric planetary traction drive super-turbocharger 200. The eccentric planetary traction drive super-turbocharger 200 comprises at least two support planets 210, 212, a turbo shaft 202, a loading planet 214, an outer ring 216 and a transfer gear 218.

Turbo shaft 202 has compressor 204 attached to one end and turbine 206 attached to an opposite end. Shaft traction surface 208 is located on a substantially central part of turbo shaft 202. Support planets 210, 212 are held in place by a planet carrier (not shown in FIG. 2) and have support planet traction surfaces 220, 222 on their outer diameters. Support planet traction surfaces 220, 222 mate with shaft traction surface 208 to form shaft-support planet traction interfaces 234, 236. Shaft-support planet traction interfaces 234, 236 transfer torque between turbo shaft 202 and support planets 210, 212. Loading planet 214 is located substantially opposite support planets 210, 212 with respect to turbo shaft 202. Loading planet 214 has a larger outer diameter than support planets 210, 212. Loading planet 214 is mounted in a planet carrier (not shown in FIG. 2) in a manner which allows translative directional movement, normal to its axis of rotation. This translative movement of the loading planet 214 can be enabled by using a flexible mounting mechanism, such as tolerance rings (not shown in FIG. 2).

Loading planet traction surface 224 is formed on the outer diameter of loading planet 214. Loading planet traction surface 224 mates with shaft traction surface 208 to form shaft-loading planet traction interface 238. Shaft-loading planet traction interface 238 transmits torque between turbo shaft 202 and loading planet 214. Support planet traction surfaces 220, 222 and loading planet traction surface 224 mate with ring traction surface 232 of outer ring 216 to form support planet-ring traction interfaces 240, 242 and loading planet-ring traction interface 244. Support planet-ring traction interfaces 240, 242 and loading planet-ring interface 244 transmit torque between support planets 210, 212, loading planet 214, and outer ring 216.

Outer ring 216 is located eccentrically, i.e. the outer ring 216 has a different rotational axis, with respect to turbo shaft 202, such that a wedge gap exists where loading planet 214 is located. This is the same in principle as the wedge gap in FIG. 1 which allows movement of the loading planet 214. When torque is applied in either direction through eccentric planetary traction drive super-turbocharger 200, loading planet 214 has a translative movement from its nominal location, and it moves into a tighter space between turbo shaft 202 and outer ring 216, so that the normal force through all of the traction interfaces 234, 236, 238, 240, 242, 244 increases. The direction of the torque applied will affect the direction of the translative movement of the loading planet 214. The torque capacity of traction interfaces 234, 236, 238, 240, 242, 244 is proportional to the normal force on those interfaces. Essentially, torque capacity is proportional to normal force times a friction coefficient. Accordingly, as the normal force increases, so does the torque capacity. The torque transfer is related to the slip in the traction drive, and the slip in the traction drive is dependent on the torque applied to the turbo shaft 202 or outer ring 216. The slip will increase with torque until the torque capacity is reached. Outer ring 216 is connected to a transfer gear 218 that connects eccentric planetary traction drive super-turbocharger 200 to an engine system (not shown).

Figure 3:
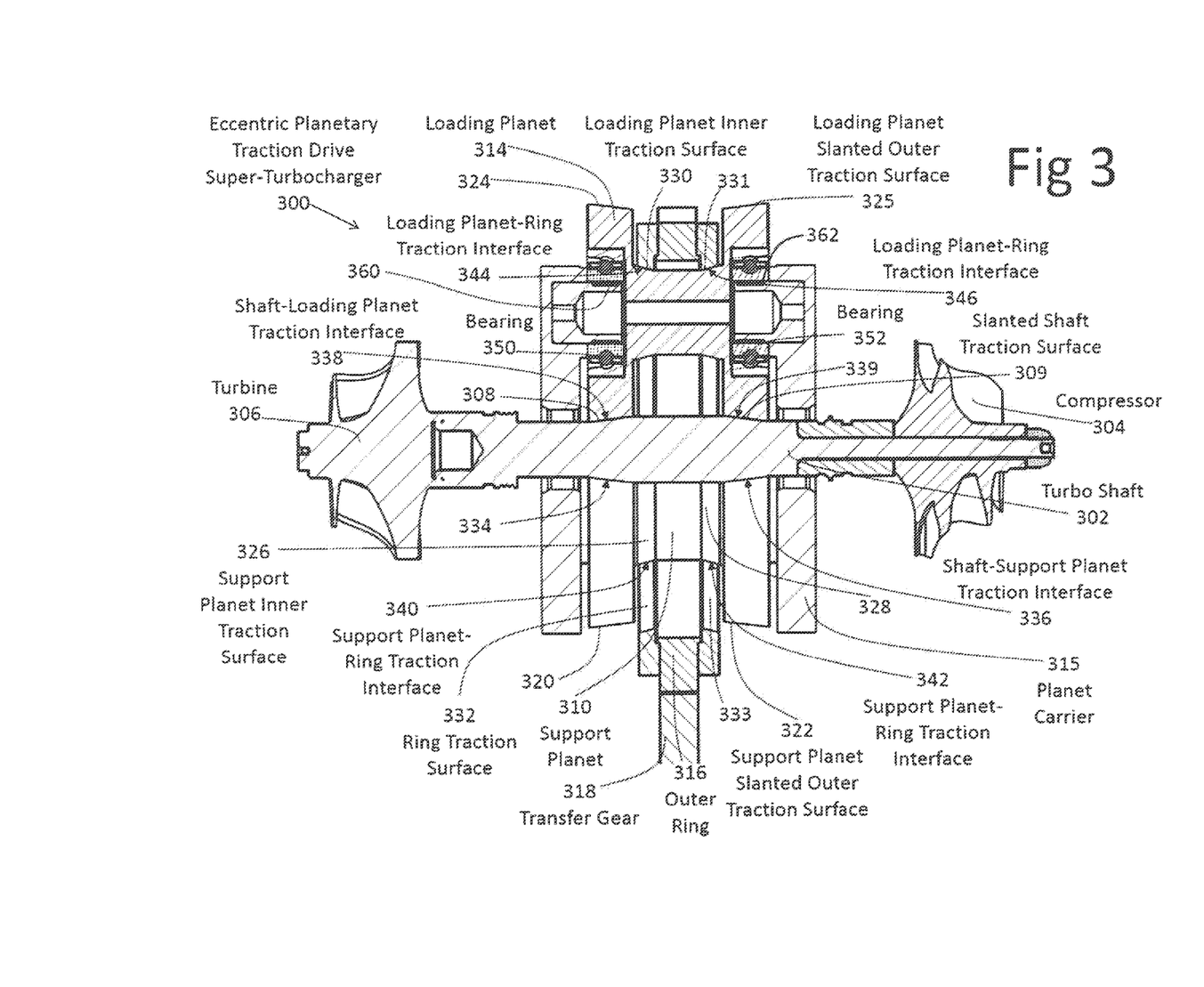
FIG. 3 is a schematic cross-sectional view of a double roller, thrust absorbing eccentric planetary traction drive super-turbocharger.

FIG. 3 is a schematic cross-sectional view of a double roller, thrust absorbing eccentric planetary traction drive super-turbocharger 300. The double roller, thrust absorbing planetary traction drive super-turbocharger 300 comprises at least two support planets 310 (the second support planet is not shown in FIG. 3 due to the cross-sectional aspect of FIG. 3, but corresponds to support planet 212 of FIG. 2), a turbo shaft 302, a loading planet 314, an outer ring 316 and a transfer gear 318. Also shown are a turbine 306 and a compressor 304.

Turbo shaft 302 has slanted shaft traction surfaces 308, 309 that slant in equal but opposite directions. Compressor 304 is attached to one end of turbo shaft 302 and turbine 306 is attached to the other end of turbo shaft 302. Support planet 310 is held in place by planet carrier 315. Support planet 310 has support planet slanted outer traction surfaces 320, 322 that mate with slanted shaft traction surfaces 308, 309 to form shaft-support planet traction interfaces 334, 336. Shaft-support planet traction interfaces 334, 336 transmit torque between turbo shaft 302 and support planet 310. Loading planet 314 has loading planet slanted outer traction surfaces 324, 325 that mate with slanted shaft traction surfaces 308, 309 to form shaft-loading planet traction interfaces 338, 339. Shaft-loading planet traction interfaces 338, 339 transmit torque between turbo shaft 302 and loading planet 314. The outer diameter of loading planet 314 is greater than the outer diameter of support planet 310. The slanted traction surfaces 308, 309, 320, 322, 324, 325 locate turbo shaft 302 axially and absorb thrust forces from compressor 304 and turbine 306, as taught in U.S. Patent Application Ser. No. 61/906,938, filed Nov. 21, 2013, entitled "Thrust Absorbing Planetary Traction Drive Superturbo," which has been specifically incorporated herein by reference for all that it discloses and teaches.

Loading planet 314 is mounted in planet carrier 315 with bearings 350, 352 such that loading planet 314 can move in a translative direction normal to its axis of rotation. Outer ring 316 is located eccentrically to turbo shaft 302 such that a wedge gap exists where loading planet 314 is located. Ring traction surfaces 332, 333 mate with support planet inner traction surfaces 326, 328 as well as loading planet inner traction surfaces 330, 331 to form support planet-ring traction interfaces 340, 342 and loading planet-ring traction interfaces 344, 346. Planet-ring traction interfaces 340, 342 and loading planet-ring traction interfaces 344, 346 transmit torque between outer ring 316, and support planet 310 and loading planet 314. Outer ring 316 interfaces with transfer gear 318, which couples the eccentric planetary traction drive super-turbocharger 300 to an engine system. Due to the location of support planet 310, the support planet-ring traction interface 342 is not 180 degrees opposite of the loading planet-ring traction interface 346. The support planets, as shown in FIG. 1A are not diametrically opposed to the loading planet 314. Accordingly, the support planet-ring traction interface 342 is shown as being above the shown lowest portion of the ring traction surface 332.

Ring traction surfaces 332, 333, support planet inner traction surfaces 326, 328, and loading planet inner traction surfaces 330, 331 may be slanted so that outer ring 316 is located axially by loading planet 314 and the support planets 310 (and the support planet corresponding to 212 of FIG. 1A). Support planet inner traction surfaces 326, 328 have a smaller diameter than support planet slanted outer traction surfaces 320, 322. Loading planet inner traction surfaces 330, 331 similarly have a smaller diameter than loading planet slanted outer traction surfaces 324, 325. The differences in diameter increase the gear reduction ratio from turbo shaft 302 to outer ring 316 in a compact package. The diameters of support planet inner traction surfaces 326, 328 and loading planet inner traction surfaces 330, 331 enable a speed reduction ratio from turbo shaft 302 to outer ring 316 through support planet 310 that is the same as a speed reduction ratio from turbo shaft 302 to outer ring 316 through loading planet 314.

Applying torque to either turbo shaft 302 or outer ring 316 causes translative movement of loading planet 314 in the wedge gap between turbo shaft 302 and outer ring 316. The translative movement is shown in regard to FIG. 1B. The translative movement causes loading planet 314 to move into a tighter space between turbo shaft 302 and outer ring 316. An increase in the normal force on all of the traction interfaces 334, 336, 338, 339, 340, 342, 344, 346 of the eccentric planetary traction drive super-turbocharger 300 results and thereby increases the torque capacity of all of these traction interfaces 334, 336, 338, 339, 340, 342, 344, 346. As a result, eccentric planetary traction drive super-turbocharger 300 automatically adjusts its torque carrying capacity to match its torque throughput requirement during various operation conditions of the engine system.

Tolerance ring 160 provides flexible mounting of the loading planet 114 as discussed above in regard to FIG. 1A and FIG. 1B. As shown in FIG. 3, the tolerance rings 360, 362 are mounted inside of bearings 350, 352. The tolerance rings 360, 362 may absorb vibrational impacts from any sort of out-of-balance of rotating parts or vibrational effects created by loading planet 314. Tolerance rings 360, 362 allow the bearings 350, 352 and loading planet 314 to move into the wedge gap as discussed in regard to FIG. 1A and FIG. 1B. Tolerance rings 360, 362 are radial springs that are capable of elastic movement in a radial direction. The tolerance rings 360, 362 are capable of compressing, which allows the loading planet 314 to move in a translative direction. The tolerance rings 360, 362 may be manufactured of any suitable material that allows for elastic movement. In an embodiment of the invention, the tolerance rings 360, 362 may be constructed from a spring type of steel that has a wavy type configuration that is formed into a ring. The wavy configuration allows the tolerance rings 360, 362 to be compressed with a certain amount of force depending upon the thickness and elasticity of the spring steel used in the tolerance rings 360, 362. Since the tolerance rings 360, 362 have a wavy configuration, the tolerance rings 360, 362 can be deflected in a radial direction so that the bearings 350, 352 and the loading planet 314 can be deflected into the wedge gap as shown in FIG. 1B.

Figure 4:
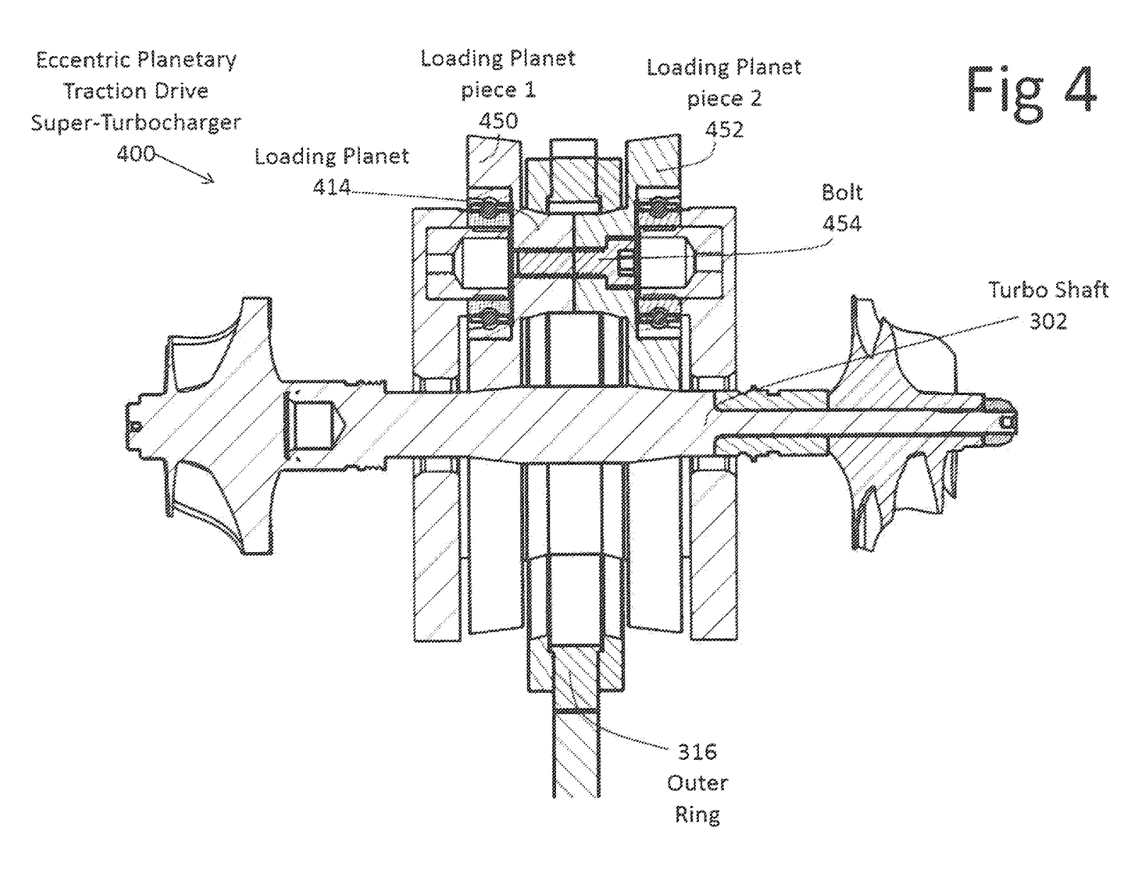
FIG. 4 is a schematic cross-sectional view of the embodiment of FIG. 3, with a two-piece loading planet for assembly and preload of the traction interfaces.

FIG. 4 is a schematic cross-sectional view of the embodiment of FIG. 3. The eccentric planetary traction drive super-turbocharger 400 comprises a turbo shaft 302, a loading planet 414, a loading planet (piece 1) 450, a loading planet (piece 2) 452 and a bolt 454.

The two-piece loading planet 414 allows for assembly and preload of the traction interfaces 334, 336, 338, 339, 340, 342, 344, 346 described in FIG. 3. The function of the eccentric planetary traction drive super-turbocharger 400 is essentially the same as the embodiment of the eccentric planetary traction drive super-turbocharger of FIG. 3. In the embodiment shown in FIG. 4, the two-piece loading planet 414 enables tuning the preload on the traction interfaces 334, 336, 338, 339, 340, 342, 344, 346 during assembly. The two-piece loading planet 414 also simplifies the assembly of the eccentric planetary traction drive super-turbocharger 400. Loading planet 414 is split into two pieces, 450, 452 that are held together by bolt 454. During assembly, the loading planet pieces 450, 452 are fit together on opposite sides of outer ring 316. Bolt 454 is tightened to hold loading planet pieces 450, 452 together. As bolt 454 is tightened, loading planet pieces 450, 452 contact both outer ring 316 and turbo shaft 302 with increasing amounts of force, which increases the normal forces through all of the traction interfaces 334, 336, 338, 339, 340, 342, 344, 346. In this way, bolt 454 can be tightened to a designated torque that sets a desired preload normal force on all of the traction interfaces 334, 336, 338, 339, 340, 342, 344, 346. The traction interfaces are not designated on FIG. 4, but it is understood that similar, or the same, traction interfaces are present as in FIG. 3.

Figure 5:
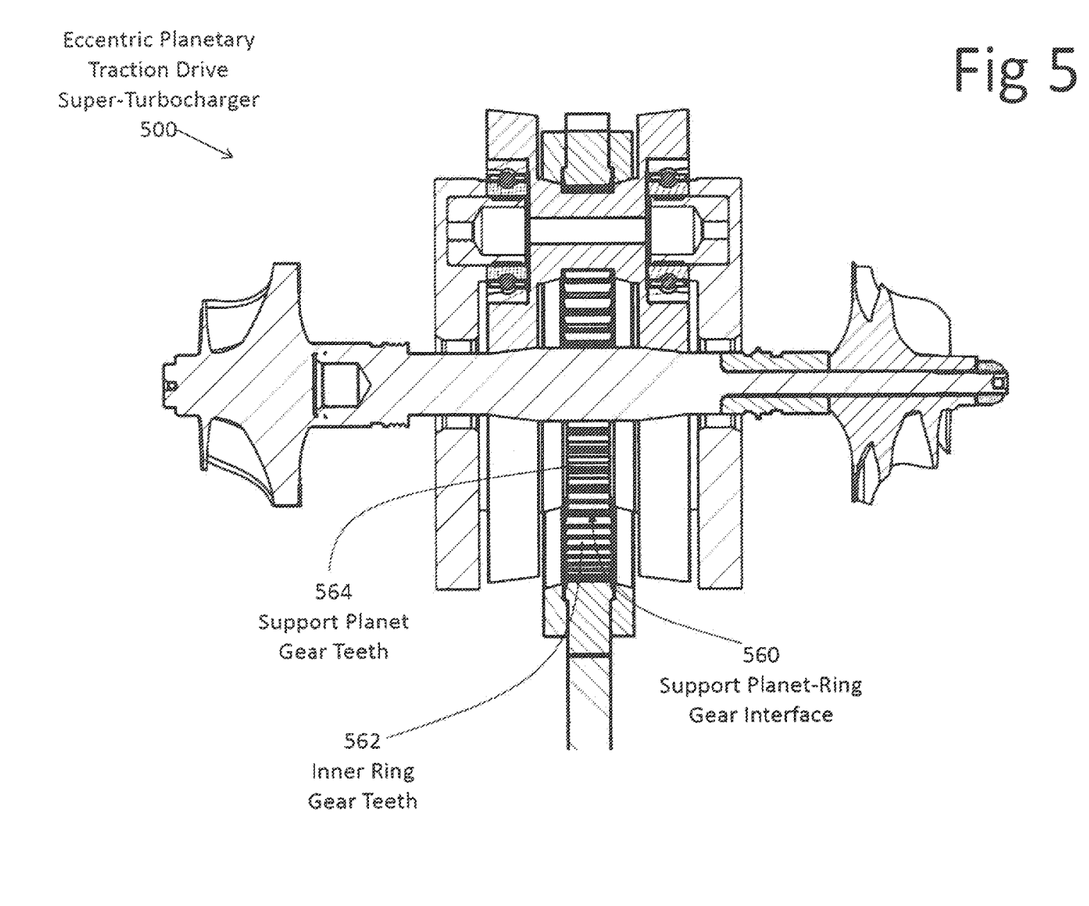
FIG. 5 is a schematic cross-sectional view of the embodiment of FIG. 3, with the addition of support planet-ring gear interfaces.

FIG. 5 is a schematic cross-sectional view of a variation of the embodiment of FIG. 3. The double roller, thrust absorbing planetary traction drive super-turbocharger 500 additionally comprises support planet gear teeth 564, inner ring gear teeth 562 and a support planet-ring gear interface 560.

In an embodiment of the eccentric planetary traction drive super-turbocharger 500, additional torque capacity may be necessary beyond what support planet-ring traction interfaces 340, 342 can provide. Inner ring gear teeth 562 and support planet gear teeth 564 form support planet-ring gear interfaces 560 between each support planet 310 and outer ring 316. Support planet-ring gear interfaces 560 are at substantially the same diameter as support planet-ring traction interfaces 340, 342. Accordingly, both interfaces act in parallel to transfer torque between support planets 310 and outer ring 316. In the embodiment, loading planet 314 does not have any additional gears, so that there is no interference with the translative movement of loading planet 314 in the wedge gap (as shown in FIG. 1A) to provide loading of the traction interfaces 334, 336, 338, 339, 340, 342, 344, 346.

Figure 6:
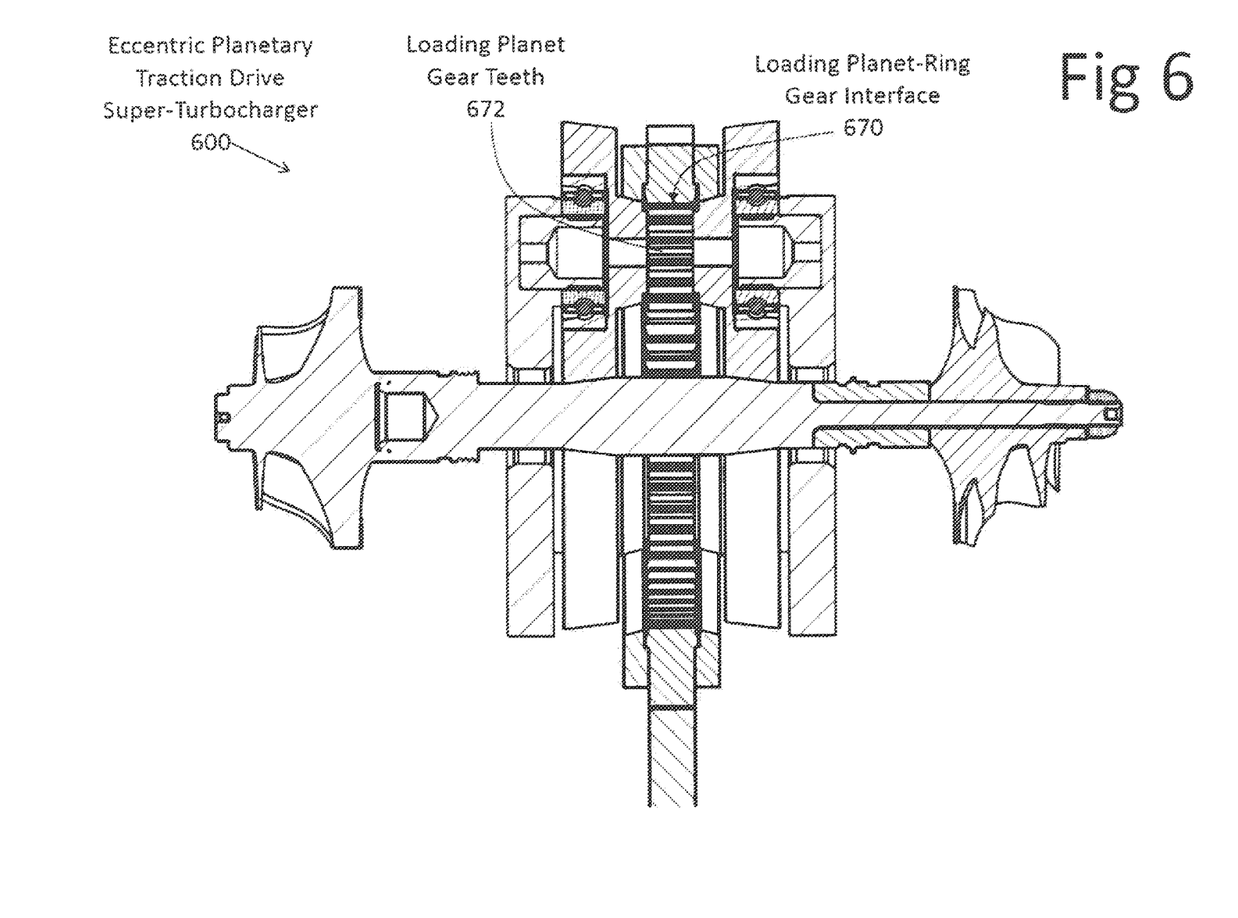
FIG. 6 is a schematic cross-sectional view of the embodiment of FIG. 5, with the addition of a loading planet-ring gear interface.

FIG. 6 is a schematic cross-sectional view of the embodiment of FIG. 5. The eccentric planetary traction drive super-turbocharger 600 additionally comprises loading planet gear teeth 672 and a loading planet-ring gear interface 670.

Loading planet gear teeth 672 mesh with inner ring gear teeth 562 to form loading planet-ring gear interface 670. Loading planet-ring gear interface 670 transmits additional torque between loading planet 314 and outer ring 316 than is possible through only loading planet-ring traction interfaces 344, 346.

Figure 7:
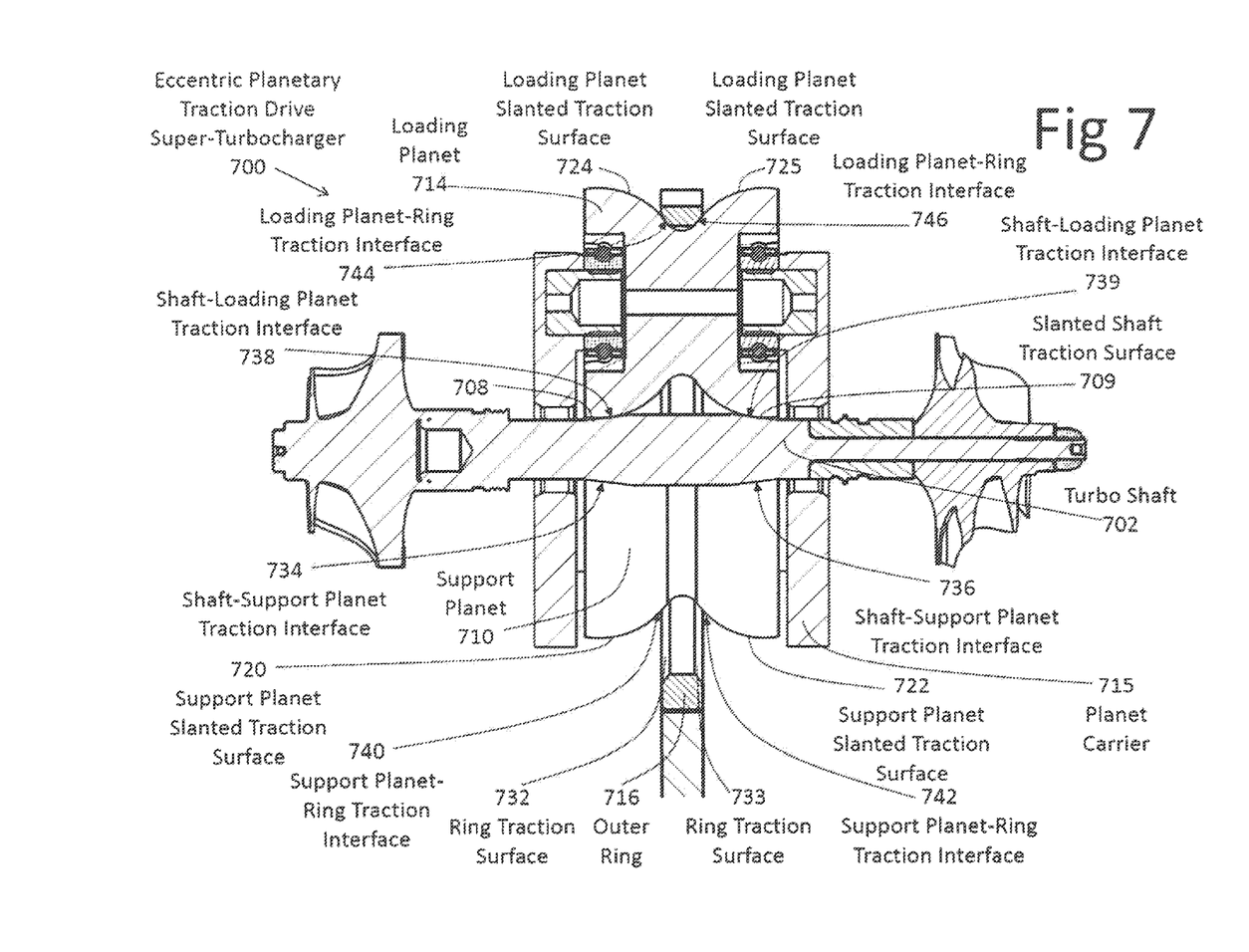
FIG. 7 is a schematic cross-sectional view of an embodiment of a double roller eccentric planetary traction drive super-turbocharger.

FIG. 7 is a schematic cross-sectional view of an embodiment of a double roller eccentric planetary traction drive super-turbocharger 700. The eccentric planetary traction drive super-turbocharger 700 comprises support planets 710, a turbo shaft 702, a loading planet 714, an outer ring 716 and a planet carrier 715.

The embodiment shown in FIG. 7 is similar to an embodiment shown in FIG. 3. The embodiment of FIG. 7 does not show split planetary traction surfaces. Each planet has two equivalent, slanted, or angled, traction surfaces that mate with the turbo shaft 702 on an outer portion and with outer ring 716 on an inner portion. Outer ring 716 contacts each planet at a smaller diameter than turbo shaft 702, so that a large step-down ratio from turbo shaft 702 to outer ring 716 can be achieved with compact packaging, while simplifying the shape of the planets.

Support planet 710 is held in place by planet carrier 715 and has equal but opposite support planet slanted traction surfaces 720, 722 that slant, or are angled, inwardly. Turbo shaft 702 has slanted shaft traction surfaces 708, 709 that mate with outer portions of support planet slanted traction surfaces 720, 722 to form shaft-support planet traction interfaces 734, 736. Shaft-support planet traction interfaces transfer torque between turbo shaft 702 and support planet 710. Outer ring 716 has ring traction surfaces 732, 733 that mate with inner portions of support planet slanted traction surfaces 720, 722 to form support planet-ring traction interfaces 740, 742. Support planet-ring traction interfaces 740, 742 transfer torque between support planet 710 and outer ring 716. The inner portions of support planet slanted traction surfaces 720, 722 that contact outer ring 716 have a smaller diameter so that the overall reduction ratio from turbo shaft 702 to outer ring 716 is increased. Loading planet 714 has loading planet slanted traction surfaces 724, 725 that are substantially equal but opposite and slant, or angle, inwardly. Slanted shaft traction surfaces 708, 709 mate with outer portions of loading planet slanted traction surfaces 724, 725 to form shaft-loading planet traction interfaces 738, 739 and ring traction surfaces 732, 733 mate with inner portions of loading planet slanted traction surfaces 724, 725 to form loading planet-ring traction interfaces 744, 746. Outer ring 716 contacts loading planet 714 at a smaller diameter than turbo shaft 702 which increases the reduction ratio from turbo shaft 702 to outer ring 716. Shaft-loading planet traction interfaces 738, 739 transfer torque between turbo shaft 702 and loading planet 714. Loading planet-ring traction interfaces 744, 746 transfer torque between loading planet 714 and outer ring 716. The shapes of loading planet slanted traction surfaces 724, 725 allow the reduction ratio from turbo shaft 702 to outer ring 716 through loading planet 714 to substantially match the reduction ratio from turbo shaft 702 to outer ring 716 through support planet 710.

Loading planet 714 is of a larger diameter than support planet 710, and is located in a wedge gap between turbo shaft 702 and outer ring 716. The loading planet 714 is mounted in planet carrier 715 in such a way that provides for translative movement. This translative movement of loading planet 714 is similar to the translative movement shown in FIG. 1B. When torque is applied to eccentric planetary traction drive super-turbocharger 700, loading planet 714 moves into the wedge gap and increases normal forces on all of the traction interfaces 734, 736, 738, 739, 740, 742, 744, 746. This increases the torque capacity of the traction interfaces 734, 736, 738, 739, 740, 742, 744, 746 as torque demand increases. Additionally, the slanted traction surfaces 708, 709, 720, 722, 724, 725 locate turbo shaft 702 axially and absorb thrust forces on turbo shaft 702, as taught in U.S. Patent Application Ser. No. 61/906,938, filed Nov. 21, 2013, entitled "Thrust Absorbing Planetary Traction Drive Super-turbo," which has been specifically incorporated herein by reference for all that it discloses and teaches.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An eccentric planetary traction drive super-turbocharger that is driven by an engine system and driven by exhaust gases from said engine system comprising:
   a turbo shaft;
   a turbine connected to one end of said turbo shaft;
   a compressor connected to an opposite end of said turbo shaft from said turbine;
   a first support planet held in a planet carrier, said first support planet having a first support planet outer traction surface that mates with said turbo shaft to form a first shaft-support planet traction interface that transfers torque between said turbo shaft and said first support planet;
   a second support planet held in said planet carrier, said second support planet having a second support planet outer traction surface that mates with said turbo shaft to form a second shaft-support planet traction interface that transfers torque between said turbo shaft and said second support planet;
   a loading planet located substantially opposite a midpoint between said support planets with respect to said turbo shaft and having a loading planet outer traction surface that mates with said turbo shaft to form a shaft-loading planet traction interface, said shaft-loading planet traction interface transferring torque between said turbo shaft and said loading planet, wherein said loading planet outer traction surface of said loading planet is of a larger diameter than said first support planet outer traction surface and said second support planet outer traction surface;
   an outer ring that mates with said first support planet, said second support planet and said loading planet and that is offset from said turbo shaft such that a wedge gap exists where said loading planet is located so that translative movement of said loading planet will force said loading planet into a smaller space between said outer ring and said turbo shaft and increase normal forces through said shaft-loading planet traction interface and said first and second shaft-support planet traction interfaces; and
   a transfer gear coupled to said outer ring that couples said eccentric planetary traction drive super-turbocharger to said engine system.

2. The eccentric planetary traction drive super-turbocharger of claim 1, wherein:
   said turbo shaft comprises a slanted shaft traction surface;
   said first support planet comprises a slanted outer traction surface at an angle complimentary to said slanted shaft traction surface that mates with said slanted shaft traction surface to transfer torque to and from said turbo shaft and absorb thrust forces on said turbo shaft; and
   said second support planet comprises a slanted outer traction surface at an angle complimentary to said slanted shaft traction surface that mates with said slanted shaft traction surface to transfer torque to and from said turbo shaft and absorb thrust forces on said turbo shaft.

3. The eccentric planetary traction drive super-turbocharger of claim 2 wherein:
   said turbo shaft comprises a second slanted shaft traction surface which is slanted at an opposite angle as said slanted shaft traction surface;

said first support planet comprises a double roller having a second slanted outer traction surface at an angle complimentary to said second slanted shaft traction surface that mates with said second slanted shaft traction surface to transfer torque to and from said turbo shaft and absorb thrust forces on said turbo shaft;

said second support planet comprises a double roller having a second slanted outer traction surface at an angle complimentary to said second slanted shaft traction surface that mates with said second slanted shaft traction surface to transfer torque to and from said turbo shaft and absorb thrust forces on said turbo shaft.

4. The eccentric planetary traction drive super-turbocharger of claim 3 wherein:

said loading planet comprises a double roller having a first slanted outer traction surface at an angle complimentary to said slanted shaft traction surface that mates with said slanted shaft traction surface to transfer torque between said turbo shaft and said loading planet and absorb thrust forces on said turbo shaft and a second slanted outer traction surface at an angle complimentary to said second slanted shaft traction surface that mates with said second slanted shaft traction surface to transfer torque between said turbo shaft and said loading planet and absorb thrust forces on said turbo shaft.

5. The eccentric planetary traction drive super-turbocharger of claim 3 wherein:

said first support planet comprises inner traction surfaces that are of a smaller diameter than said first support planet outer traction surfaces and that mate with ring traction surfaces on said outer ring to form a first support planet-ring traction interface;

said second support planet comprises inner traction surfaces that are of a smaller diameter than said second support planet outer traction surfaces and that mate with ring traction surfaces on said outer ring to form a second support planet-ring traction interface; and said loading planet comprises inner traction surfaces that are of a smaller diameter than said loading planet outer traction surfaces of said loading planet and that mate with said ring traction surfaces to form loading planet-ring traction interfaces, wherein a speed ratio from said turbo shaft to said ring through said first and second support planets is equal to a speed ratio from said turbo shaft to said ring through said loading planet, and torque is transferred between said outer ring and said first and second support planets and said loading planet.

6. The eccentric planetary traction drive super-turbocharger of claim 4 wherein said loading planet comprises a first half and a second half enabled to be tightened together for assembly.

7. The eccentric planetary traction drive super-turbocharger of claim 4 wherein:

said first support planet comprises a plurality of gear teeth located substantially centrally on said first support planet that mate with a plurality of inner gear teeth on said outer ring creating a first support planet-ring gear interface at substantially the same diameter as said support planet-ring traction interfaces;

said second support planet comprises a plurality of gear teeth located substantially centrally on said first support planet that mate with a plurality of inner gear teeth on said outer ring creating a second support planet-ring gear interface at substantially the same diameter as said support planet-ring traction interfaces.

8. The eccentric planetary traction drive super-turbocharger of claim 7 wherein:

said loading planet comprises gear teeth located centrally on said loading planet that mate with said inner gear teeth on said outer ring that create a loading planet-ring gear interface at substantially the same diameter as said loading planet-ring traction interfaces.

9. A method of transferring rotational mechanical energy in a super-turbocharger having an eccentric planetary traction drive comprising:

providing a turbo shaft that is connected to a turbine and a compressor;

driving said super-turbocharger mechanically with an engine system and with exhaust gases from said engine system;

providing a first support planet and a second support planet wherein each of said first support planet and said second support planet is held in a planet carrier and have support planet outer traction surfaces that mate with said turbo shat to form shaft-support planet traction interfaces that transfer torque between said turbo shaft and said support planets;

locating a loading planet substantially opposite a midpoint between said first support planet and said second support planet, said loading planet comprising a loading planet outer traction surface that mates with said turbo shaft to form a shaft-loading planet traction interface that transfers torque between said turbo shaft and said loading planet, wherein said loading planet outer traction surface of said loading planet is of a larger diameter than said support planet outer traction surfaces of said first support planet and said second support planet;

providing an outer ring that mates with said first support planet, said second support planet and said loading planet and is offset from said turbo shaft such that a wedge gap exists where said loading planet is located so that translative movement of said loading planet will force said loading planet into a smaller space between said outer ring and said turbo shaft; and coupling a transfer gear to said outer ring that couples said super-turbocharger to said engine system.

10. The method of claim 9 further comprising:

forming slanted shaft traction surfaces with equal but opposite angles on said turbo shaft that mate with similarly slanted outer traction surfaces of said first support planet, said second support planet and said loading planet.

11. The method of claim 10 wherein:

said first support planet comprises a double roller support planet having two equal diameter outer traction surfaces that axe slanted in equal hut opposite directions;

said second support planet comprises a double roller support planet having two equal diameter outer traction surfaces that are slanted in equal but opposite directions; and said loading planet comprises a double roller loading planet having two equal diameter outer traction surfaces that are slanted in equal but opposite directions.

12. The method of claim 11 further comprising:

forming support planet inner traction surfaces on said first support planet and said second support planet that are of a smaller diameter than said support planet outer traction surfaces of said first support planet and said second support planet wherein said support planet inner traction surfaces mate with ring traction surfaces on said outer ring to form a first support planet-ring traction interface and a second support planet-ring traction interface; and forming loading planet inner traction surfaces on said loading planet that are of a smaller diameter than said loading planet outer traction surfaces of said loading planet that mate with said ring traction surfaces to form loading planet-ring traction interfaces, such that a speed ratio from said turbo shaft to said ring through said support planets is equal to a speed ratio from said turbo shaft to said ring through said loading planet.

13. The method of claim 12 wherein:

said loading planet comprises two halves that are enabled to be tightened together to a certain tightness to set a specific preload on all of said traction interfaces of said eccentric planetary traction drive.

14. The method of claim 12 further comprising:

forming support planet gear teeth centrally on each of said first support planet and said second support planet that mate with inner gear teeth on said outer ring that create support planet-ring gear interfaces at substantially the same diameter as said support planet-ring traction interfaces.

15. The method of claim 14 further comprising:

forming loading planet gear teeth centrally on said loading planet that mate with said inner gear teeth on said outer ring that create a loading planet-ring gear interface at substantially the same diameter as said loading planet-ring traction interfaces.

16. An eccentric planetary traction drive super-turbocharger that is both driven mechanically by an engine system and driven by exhaust gases from said engine system comprising:

a turbo shaft with two equal but opposite slanted shaft traction surfaces that slope outwardly on said turbo shaft;

a turbine connected to one end of said turbo shaft;

a compressor connected to an opposite end of said turbo shaft from said turbine;

two support planets of a first diameter having equal but opposite slanted outer traction surfaces that slope inwardly on said two support planets, where an outer portion of each slanted outer traction surface mates with said slanted shaft traction surfaces to form two support planet-shaft traction interfaces that transmit torque between said turbo shaft and said two support planets as well as locate said turbo shaft axially and absorb thrust forces from said turbine and said compressor;

a loading planet of a second diameter with equal but opposite slanted outer traction surfaces that slope inwardly on said loading planet, wherein an outer portion of each slanted outer traction surface mates with said slanted shaft traction surfaces to form loading planet-shaft traction interfaces that transmit torque between said turbo shaft and said planets as well as locate said turbo shaft axially and absorb thrust forces from said turbine and said compressor;

an outer ring with slanted ring traction surfaces that mate with inner portions of each of said two support planet outer traction surfaces and said loading planet outer traction surface to form a plurality of planet-ring traction interfaces that transmit torque between said two support planets, said loading planet and said outer ring, wherein said plurality of planet-ring traction interfaces are of a smaller diameter than said planet-shaft traction interfaces to increase the rotational speed reduction ratio between said turbo shaft and said outer ring; and a transfer gear coupled to said outer ring that couples said eccentric planetary traction drive super-turbocharger to said engine system;

wherein said outer ring is located eccentrically to said turbo shaft to form a wedge gap, said loading planet being located so that when torque is applied to said eccentric planetary traction drive, said loading planet translatively moves into a smaller area between said turbo shaft and said outer ring, increasing normal forces on said two support planet-shaft traction interfaces and said loading planet-shaft traction interface.

17. A method of transferring rotational mechanical energy in a driven turbocharger for an engine system comprising:

forming a traction surface on a turbo shaft of said driven turbocharger;

mating a traction surface of at least one roller with said turbo shaft to form a traction interface with a rotational speed reduction from said turbo shaft to said roller;

coupling said roller to an outer ring which in turn interfaces to a transfer gear that connects to said engine system;

providing a torque-based loading mechanism that forces said roller toward said turbo shaft and increases a normal force on said traction interface when torque is applied to said transfer gear or said turbo shaft, so that torque capacity of said traction interface increases with an increase of torque demand through said traction interface.

* * * * *